US010857965B2

(12) United States Patent
Abe et al.

(10) Patent No.: US 10,857,965 B2
(45) Date of Patent: Dec. 8, 2020

(54) AIR BAG

(71) Applicant: JOYSON SAFETY SYSTEMS JAPAN K.K., Tokyo (JP)

(72) Inventors: Kazuhiro Abe, Tokyo (JP); Hiromi Koshiki, Tokyo (JP)

(73) Assignee: JOYSON SAFETY SYSTEMS JAPAN K.K., Tokyo (JP)

(*) Notice: Subject to any disclaimer, the term of this patent is extended or adjusted under 35 U.S.C. 154(b) by 52 days.

(21) Appl. No.: 16/316,592

(22) PCT Filed: Jul. 5, 2017

(86) PCT No.: PCT/JP2017/024612
§ 371 (c)(1),
(2) Date: Jan. 9, 2019

(87) PCT Pub. No.: WO2018/012363
PCT Pub. Date: Jan. 18, 2018

(65) Prior Publication Data
US 2019/0375363 A1  Dec. 12, 2019

(30) Foreign Application Priority Data

Jul. 12, 2016 (JP) ................................ 2016-137693
Aug. 29, 2016 (JP) ................................ 2016-166949
Dec. 9, 2016 (JP) ................................ 2016-239722

(51) Int. Cl.
*B60R 21/214* (2011.01)
*B60R 21/233* (2006.01)
(Continued)

(52) U.S. Cl.
CPC .......... *B60R 21/214* (2013.01); *B60R 21/233* (2013.01); *B60R 21/2338* (2013.01);
(Continued)

(58) Field of Classification Search
CPC ............. B60R 21/2338; B60R 21/214; B60R 2021/23386; B60R 2021/23153; B60R 21/233; B60R 2021/0048
See application file for complete search history.

(56) References Cited

U.S. PATENT DOCUMENTS 3,731,949 A * 5/1973 Radke .................. B60R 21/232
280/743.1
6,283,500 B1 9/2001 Eckert et al.
(Continued)

FOREIGN PATENT DOCUMENTS

DE  10 2009 044 692 A1  3/2011
DE  10 2007 007 010 B4  6/2011
(Continued)

OTHER PUBLICATIONS

International Search Report for Appl. Ser. No. PCT/EP2013/065903 dated Oct. 10, 2013, 4 pages.
(Continued)

*Primary Examiner* — Frank B Vanaman
(74) *Attorney, Agent, or Firm* — Foley & Lardner LLP

(57) ABSTRACT

An air bag has a large occupant-receiving area when expanded. The air bag has: a top chamber, which expands along a ceiling part; a first chamber, which expands downwards and rearwards from the rear part to the top chamber; a second chamber continuous from the lower part of the first chamber, the second chamber expanding downwards; and a third chamber continuous from the lower part of the second chamber, the third chamber expanding forwards. The expanded first chamber restrains the head of an occupant, and the second chamber restrains the chest to the trunk.

24 Claims, 12 Drawing Sheets

(51) Int. Cl.
*B60R 21/231* (2011.01)
*B60R 21/00* (2006.01)
*B60R 21/2338* (2011.01)

(52) U.S. Cl.
CPC ........... *B60R 2021/0048* (2013.01); *B60R 2021/23153* (2013.01); *B60R 2021/23386* (2013.01)

(56) References Cited

U.S. PATENT DOCUMENTS

| | | | |
|---|---|---|---|
| 6,557,887 B2 | 5/2003 | Wohllebe | |
| 6,722,691 B1 | 4/2004 | Håland et al. | |
| 7,918,480 B2 | 4/2011 | Kwon et al. | |
| 7,926,840 B1 | 4/2011 | Choi | |
| 8,002,309 B2 | 8/2011 | Kim et al. | |
| 9,308,883 B1 | 4/2016 | Schneider | |
| 9,505,371 B2 | 11/2016 | Kawamura et al. | |
| 9,623,831 B1* | 4/2017 | Deng | B60R 21/01 |
| 9,707,921 B2 | 7/2017 | Fischer et al. | |
| 2003/0094794 A1* | 5/2003 | Amamori | B60R 21/233 280/729 |
| 2010/0133797 A1 | 6/2010 | Kim et al. | |
| 2010/0327567 A1 | 12/2010 | Choi et al. | |
| 2011/0101660 A1* | 5/2011 | Schneider | B60R 21/206 280/731 |
| 2012/0049492 A1 | 3/2012 | Choi et al. | |
| 2012/0080869 A1* | 4/2012 | Lee | B60R 21/214 280/729 |
| 2012/0119473 A1* | 5/2012 | Lee | B60R 21/231 280/728.2 |
| 2012/0133114 A1 | 5/2012 | Choi et al. | |
| 2013/0087995 A1 | 4/2013 | Lee et al. | |
| 2013/0292927 A1 | 11/2013 | Lee et al. | |
| 2015/0203066 A1 | 7/2015 | Pausch et al. | |

FOREIGN PATENT DOCUMENTS

| | | |
|---|---|---|
| DE | 10 2010 016 998 A1 | 6/2011 |
| DE | 10 2010 060 928 A1 | 3/2012 |
| DE | 10 2011 056 992 A1 | 4/2013 |
| EP | 1 502 825 A1 | 8/1985 |
| JP | 2002-508273 A | 3/2002 |
| JP | 2002-534321 A | 10/2002 |
| JP | 2006-142964 A | 6/2006 |
| JP | 2008-284904 A | 11/2008 |
| JP | 2013-082418 A | 5/2013 |
| JP | 2015-522482 A | 8/2015 |
| JP | 2016-030545 A | 3/2016 |
| JP | 6156279 B2 | 7/2016 |
| WO | WO-2008-095615 A1 | 8/2008 |
| WO | WO-2010/128762 A2 | 11/2010 |
| WO | WO-2014/016432 A1 | 1/2014 |
| WO | WO-2014-016432 A1 | 1/2014 |
| WO | WO-2016-064936 A1 | 4/2016 |

OTHER PUBLICATIONS

International Searching Authority, "International Search Report," issued in connection with International Patent Application No. PCT/JP2017/024612, dated Oct. 3, 2017.

International Searching Authority, "Written Opinion," issued in connection with International Patent Application No. PCT/JP2017/024612, dated Oct. 3, 2017.

* cited by examiner

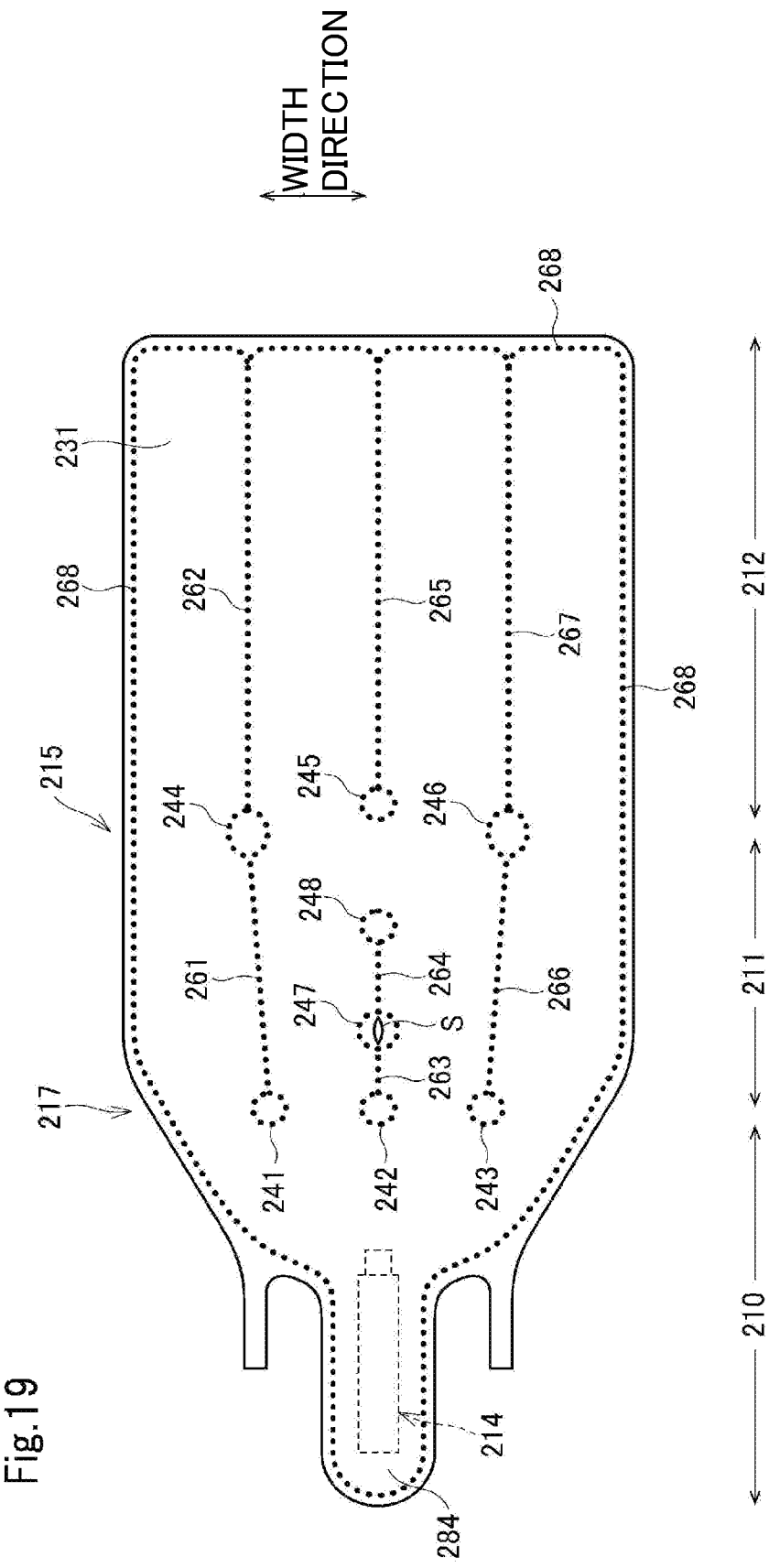

AIR BAG

CROSS-REFERENCE TO RELATED APPLICATIONS

The present application is a national phase of International Application No. PCT/JP2017/024612, filed Jul. 5, 2017, which claims priority to Japanese Patent Application Nos. 2016-137693, filed on Jul. 12, 2016, 2016-166949, filed on Aug. 29, 2016, and 2016-239722, filed on Dec. 9, 2016. The contents of these applications are hereby incorporated by reference in their entireties.

TECHNICAL FIELD

The present invention relates to an airbag for restraining an occupant in a vehicle, preferably to a rear seat airbag.

BACKGROUND ART

As a rear seat airbag for restraining a rear seat occupant, WO2016/064936A1 describes a rear seat airbag which is inflated into a U-shape or an inverted U-shape in a side view.

WO2014/016432A1 describes a rear seat airbag which is inflated into a V-shape in a side view.

Patent Document 1: WO2016/064936
Patent Document 2: WO2014/016432

SUMMARY OF INVENTION

An object of the present invention is to provide an airbag having a large occupant-receiving area when inflated.

According to one aspect of the present invention, an object of the present invention is to provide an airbag in which rearward swinging of the inflated airbag is prevented.

The airbag of the present invention is inflated in front of an occupant seated in a seat by gas from an inflator. The airbag includes a first chamber and a second chamber. The first chamber is inflated downward and rearward from a vehicle interior ceiling portion. The second chamber is continuous from a lower portion of the first chamber and is inflated forward.

In one aspect of the present invention, a connection portion of the first chamber and the second chamber is a bending point of the airbag in a state where the airbag is inflated.

In one aspect of the present invention, the airbag includes a first tether. The first tether is connected between a connection portion of the first chamber and the second chamber or a peripheral portion of the connection portion, and a part in front of the first chamber.

In one aspect of the present invention, the airbag includes a second tether. The second tether is connected between the second chamber and a part in front of the first chamber.

In one aspect of the present invention, the airbag includes a first tether, a second tether and a top chamber. The first tether is connected between a connection portion of the first chamber and the second chamber or a peripheral portion of the connection portion, and a part in front of the first chamber. The second tether is connected between the second chamber and the part in front of the first chamber. The top chamber is inflated along the vehicle interior ceiling portion. The first chamber is continuous from a rear portion of the top chamber. An upper end of the first tether and an upper end of the second tether are continuous from a front portion of the top chamber.

In one aspect of the present invention, the top chamber is fixed to the vehicle interior ceiling portion at at least two places in a front-rear direction.

In one aspect of the present invention, the airbag includes a third chamber. The third chamber is provided between the top chamber and the first chamber.

In one aspect of the present invention, the airbag includes a third tether. The third tether is connected between the front portion of the top chamber and a connection portion of the first chamber and the third chamber.

In one aspect of the present invention, a gas flow path width is narrowed in the connection portion of the first chamber and the second chamber.

In one aspect of the present invention, the airbag includes a plurality of tethers. The plurality of tethers extends radially downward from the vehicle interior ceiling portion in the state where the rear seat airbag is inflated. Each of the tethers is continuous to a predetermined portion of the rear seat airbag.

In one aspect of the present invention, an intersection angle between a rear surface of the first chamber and a horizontal surface is 25° or more and 65° or less in the state where the airbag is inflated.

In one aspect of the present invention, in the state where the airbag is inflated, a center portion in a left-right direction of the rear surface of the first chamber is a concave portion which is recessed forward from left and right of the concave portion.

In one aspect of the present invention, in the state where the airbag is inflated, a center portion in the left-right direction, as well as a lower portion in an upper-lower direction of the rear surface of the first chamber, is a convex portion which protrudes rearward from left and right of the convex portion.

In one aspect of the present invention, the airbag includes a fourth tether. The fourth tether is connected between an intermediate portion of the second chamber in a front-rear direction, and an upper portion of the first chamber or a portion in front of the upper portion.

In one aspect of the present invention, a left-right width of the first chamber is larger than a left-right width of the second chamber.

An airbag of the present invention is inflated in front of an occupant seated in a seat by gas from an inflator. The airbag includes a first chamber, a second chamber and a third chamber. The first chamber is inflated downward and rearward from a vehicle interior ceiling portion. The second chamber is continuous from a lower portion of the first chamber and is inflated downward. The third chamber is continuous from a lower portion of the second chamber and is inflated forward.

In one aspect of the present invention, the airbag includes a first tether. The first tether is connected between a connection portion of the first chamber and the second chamber or a peripheral portion of the connection portion, and a part in front of the first chamber.

In one aspect of the present invention, the airbag includes a second tether. The second tether is connected between the third chamber and a part in front of the first chamber.

In one aspect of the present invention, the second tether is continuous to an intermediate portion of the inflated third chamber in a front-rear direction. A third tether is provided such that the third tether is connected between a front portion of the third chamber and a connection portion of the second chamber and the third chamber.

In one aspect of the present invention, in a state where the airbag is inflated, the front portion of the third chamber is located higher than the intermediate portion in the front-rear direction of the third chamber connected to the second tether.

In one aspect of the present invention, the airbag includes a top chamber. The top chamber is inflated along the vehicle interior ceiling portion. The first chamber is continuous from a rear portion of the top chamber. An upper end of the first tether and an upper end of the second tether are continuous from a front portion of the top chamber.

In one aspect of the present invention, a gas flow path width is narrowed in the connection portion of the first chamber and the second chamber and a gas flow path width is narrowed in the connection portion of the second chamber and the third chamber.

In one aspect of the present invention, a gas flow path width is narrowed in a connection portion of the top chamber and the first chamber.

In one aspect of the present invention, the third chamber is inflated such that a front portion of the third chamber abuts against a rear surface of a front seat.

In one aspect of the present invention, the connection portion of the first chamber and the second chamber is located below a head of the occupant.

In one aspect of the present invention, a center portion in a left-right direction of the rear surface of at least one of the first chamber and the second chamber is a concave portion which is recessed forward from left and right of the concave portion.

Advantageous Effects of Invention

The airbag of the present invention includes the first chamber which is inflated downward and rearward from the vehicle interior ceiling portion, and the second chamber which is inflated forward from the lower portion of the first chamber. At a time of vehicle collision, the first chamber restrains a vicinity of the head of the occupant, and the first chamber and the second chamber restrain an upper body such as a chest of the occupant.

The airbag has a large receiving area since a receiving surface for receiving the occupant at the time of vehicle collision is constituted by the first chamber.

The front portion of the airbag according to the present invention comes into contact with the front seat or the like, so that a forward movement of the inflated airbag is prevented.

BRIEF DESCRIPTION OF DRAWINGS

FIG. 19 is a top view of the rear seat airbag in the non-inflated state according to the third embodiment.

DESCRIPTION OF EMBODIMENTS

Figure 1:
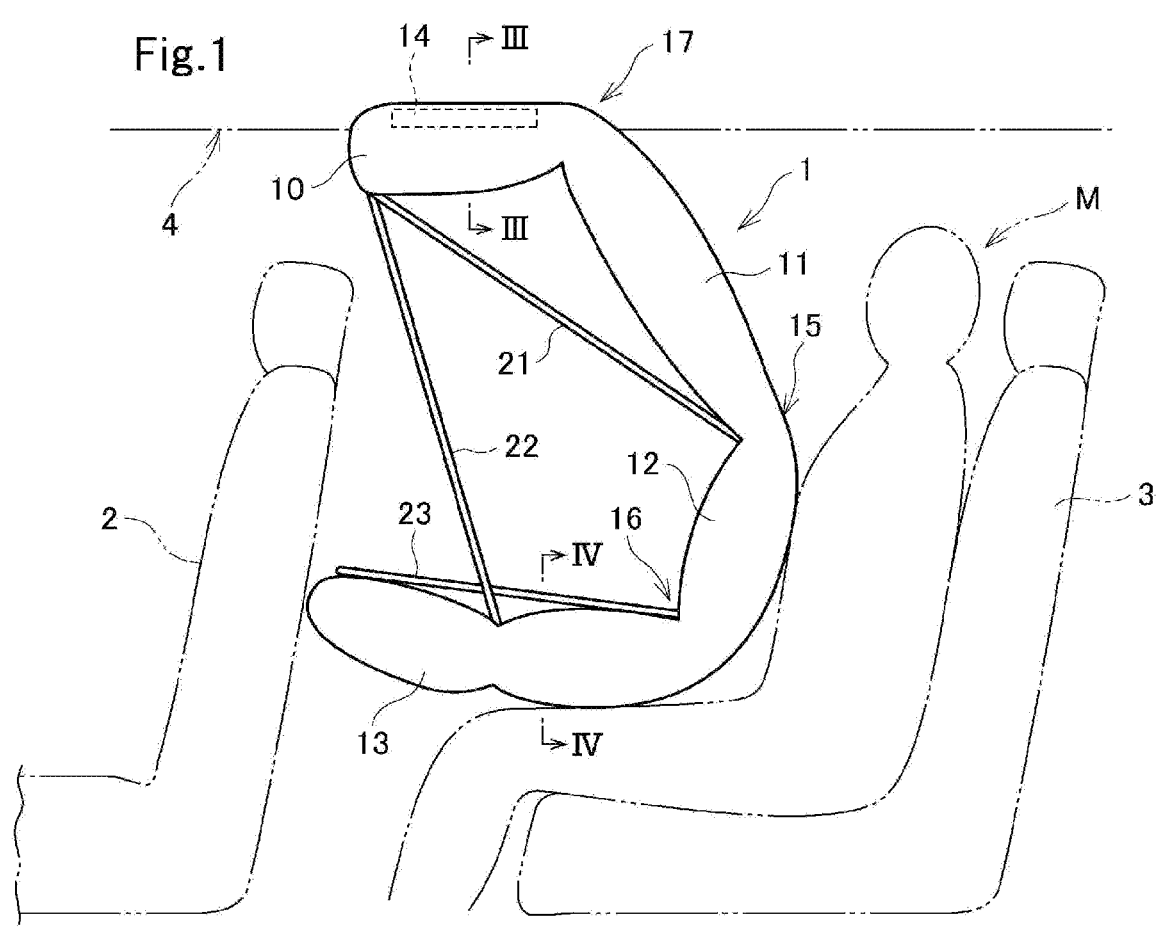
FIG. 1 is a side view of a rear seat airbag when the rear seat airbag is inflated according to a first embodiment.
Figure 2:
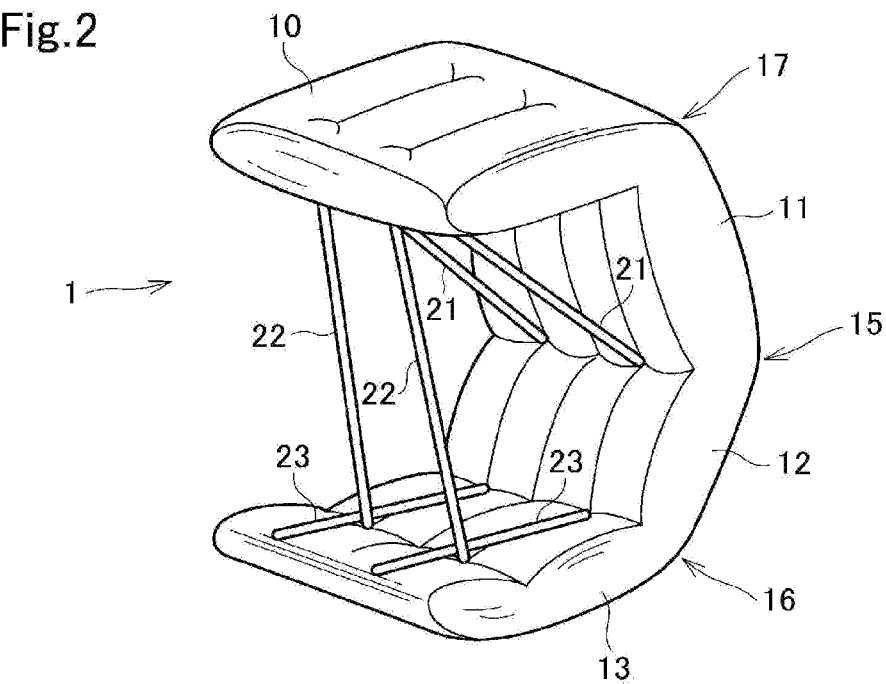
FIG. 2 is a perspective view of the rear seat airbag when the rear seat airbag is inflated according to the first embodiment.

Hereafter, embodiments are described with reference to the drawings. In the following description, front and rear, and upper and lower are coincident with front and rear, and upper and lower of a vehicle including a rear seat airbag device.

First Embodiment

FIGS. 1 to 6 illustrate a rear seat airbag 1 according to the first embodiment of the present invention. The rear seat airbag 1 is used for restraining an occupant M on a rear seat 3 by being inflated downward or being inflated downward and rearward from a ceiling portion 4 of a vehicle between a front seat 2 and the rear seat 3 of the vehicle.

The rear seat airbag 1 includes a first chamber 11 which is inflated downward and rearward from the ceiling portion 4, a second chamber 12 which is continuous from a lower portion of the first chamber 11 and is inflated downward, and a third chamber 13 which is continuous from a lower portion of the second chamber 12 and is inflated forward.

In this embodiment, the rear seat airbag 1 further includes a top chamber 10 which is inflated along the ceiling portion 4. The first chamber 11 is continuous from a rear portion of the top chamber 10. An inflator 14 is installed in the top chamber 10, so that the rear seat airbag 1 is inflated by gas from the inflator 14.

The rear seat airbag 1 includes first tethers 21 and second tethers 22 which connect a front portion of the top chamber 10 and a predetermined portion of the rear seat airbag 1.

The first tethers 21 are disposed on a front side of the first chamber 11, and the second tethers 22 are disposed on a front side of the first chamber 11 and the second chamber 12. Upper ends of the tethers 21, 22 are sewn to the front portion of the top chamber 10. Lower ends (rear ends) of the first tethers 21 are sewn to a connection portion (a boundary portion) 15 between the first chamber 11 and the second chamber 12. Lower ends of the second tethers 22 are sewn to an intermediate portion (in this embodiment, in a vicinity of an intermediate portion of the third chamber 13 in the front-rear direction) of the third chamber 13 in the front-rear direction.

The rear seat airbag 1 further includes third tethers 23 laid between a front portion of the third chamber 13 and a connection portion 16 of the second chamber 12 and the third chamber 13. Front ends of the third tethers 23 are sewn to the front portion of the third chamber 13. Rear ends of the third tethers 23 are sewn to the connection portion (a boundary portion) 16 between the second chamber 12 and the third chamber 13. The third tethers 23 are provided on an upper surface side of the third chamber 13.

The connection portion (the boundary portion) 15 between the first chamber 11 and the second chamber 12 is located in a vicinity of front of a chest or an upper abdomen of the rear seat occupant M. The connection portion (the boundary portion) 16 between the second chamber 12 and the third chamber 13 is located in a vicinity of front of a body of the rear seat occupant M. The third chamber 13 is inflated along upper surfaces of thighs of the rear seat occupant M.

As illustrated in FIGS. 3 to 6, the rear seat airbag 1 is manufactured by sewing a front panel 31 and a rear panel 32 together.

Figure 3:
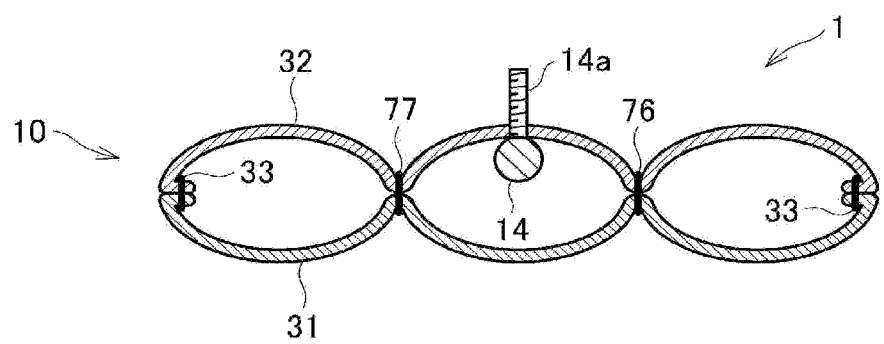
FIG. 3 is a cross-sectional view taken along a line in FIG. 1.
Figure 4:
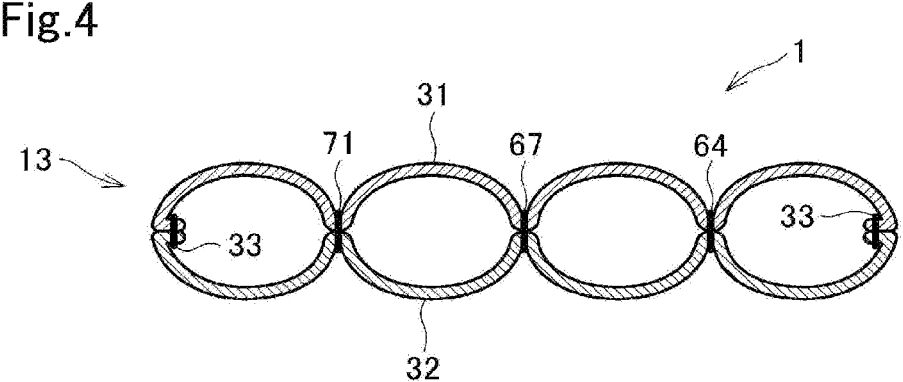
FIG. 4 is a cross-sectional view taken along a line IV-IV in FIG. 1.
Figure 5:
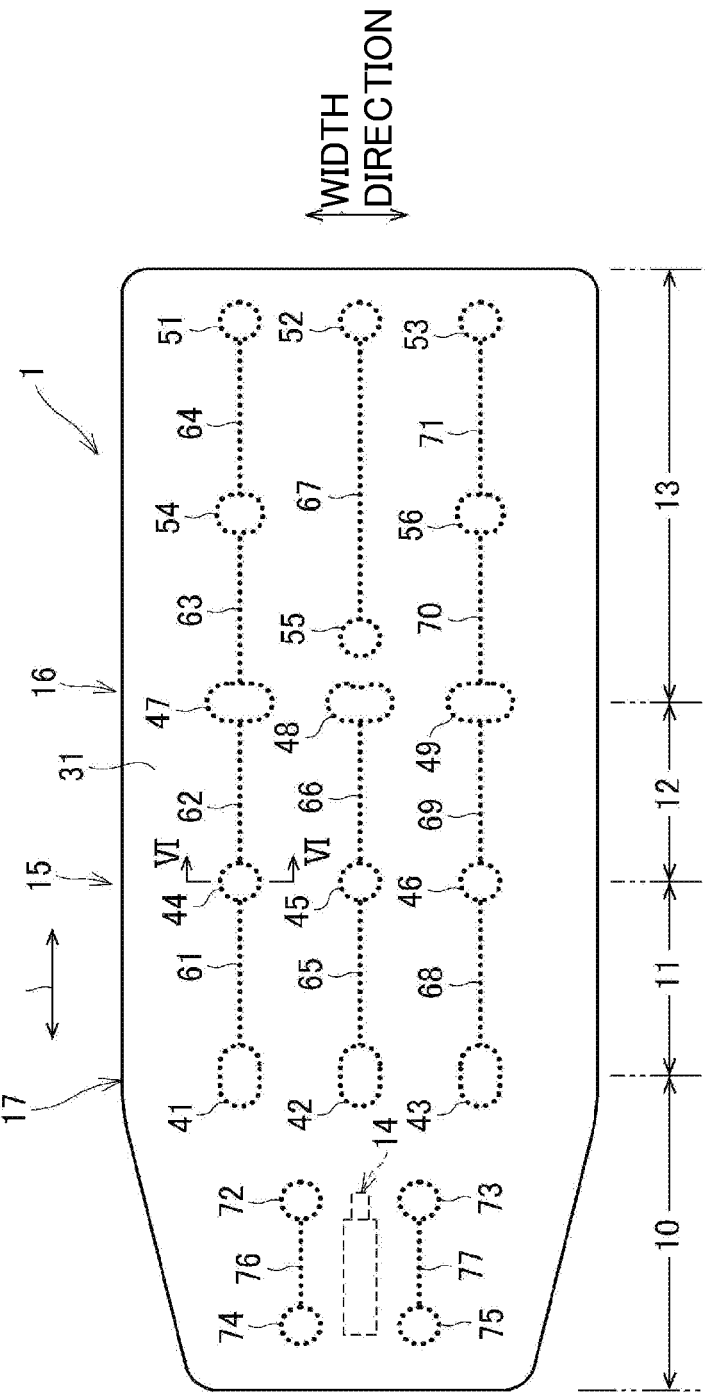
FIG. 5 is a top view of the rear seat airbag in a non-inflated state according to the first embodiment.
Figure 6:
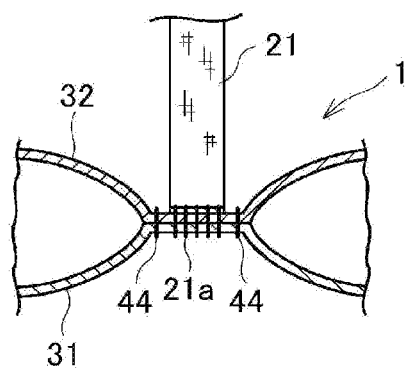
FIG. 6 is a cross-sectional view taken along a line VI-VI in FIG. 5 when the rear seat airbag is inflated.

FIG. 5 is a top view illustrating a state where the rear seat airbag 1 before inflation is flattened. FIG. 6 is a cross-sectional view taken along a line VI-VI in FIG. 5 in a state where the rear seat airbag 1 is inflated. FIGS. 3 and 4 are cross-sectional views taken along lines and IV-IV in FIG. 1.

The front panel 31 and the rear panel 32 are made of a base cloth having a substantially rectangular shape which is long in one direction. Peripheral portions of the front panel 31 and the rear panel 32 are sewn together by a suture thread 33.

The front panel 31 and the rear panel 32 are also sewn together by annular seams 41 to 49, 51 to 56, 72 to 75, and linear seams 61 to 71, 76, 77 to be described below.

At the boundary portion between the top chamber 10 and the first chamber 11, a plurality of (in this embodiment, three) the annular seams 41, 42, 43 are provided at intervals in a width direction of the rear seat airbag 1. At the boundary portion 15 between the first chamber 11 and the second chamber 12, a plurality of (in this embodiment, three) the annular seams 44, 45, 46 are provided at intervals in the width direction of the rear seat airbag 1. At the boundary portion 16 between the second chamber 12 and the third chamber 13, a plurality of (in this embodiment, three) the annular seams 47, 48, 49 are provided at intervals in the width direction of the rear seat airbag 1. In a vicinity of a front end of the third chamber 13, a plurality of (in this embodiment, three) the annular seams 51, 52, 53 are provided at intervals in the width direction of the rear seat airbag 1.

The annular seam 54 is provided between the annular seam 47 and the annular seam 51. The annular seam 56 is provided between the annular seam 49 and the annular seam 53. The annular seam 55 is provided adjacent to the annular seam 48 and is closer to the annular seam 52 than the annular seam 48.

The linear seams 61, 62, 63, 64 are provided so as to sequentially connect the annular seams 41, 44, 47, 54, 51. The linear seams 65, 66 are provided so as to sequentially connect the annular seams 42, 45, 48. The linear seam 67 is provided so as to connect the annular seams 55, 52. The linear seams 68, 69, 70, 71 are provided so as to sequentially connect the annular seams 43, 46, 49, 56, 53.

The linear seams 61 to 64, 65 to 67, 68 to 71 are parallel with each other, and extend in a longitudinal direction of the rear seat airbag 1.

In the top chamber 10, the annular seams 72 and 73 are provided on the first chamber 11 side at an interval in the width direction of the rear seat airbag 1. The annular seams 74, 75 are provided in a vicinity of a front end of the top chamber 10 at an interval in the width direction of the rear seat airbag 1. The linear seam 76 is provided so as to connect the annular seams 72, 74. The linear seam 77 is provided so as to connect the annular seams 73, 75. The linear seams 76 and 77 are parallel with each other and extend in the longitudinal direction of the rear seat airbag 1.

The inflator 14 is disposed between the linear seams 76, 77. In this embodiment, the inflator 14 is of a cylinder type. As illustrated in FIG. 3, a stud bolt 14a protrudes from a side surface of the inflator 14. The stud bolt 14a protrudes out of the rear seat airbag 1 through a bolt insertion hole provided in the rear panel 32, and is fixed to a case of the rear seat airbag device. The inflator 14 is disposed such that a gas ejection port is on the first chamber 11 side.

An inflated thickness of the rear seat airbag 1 is restricted by the annular seams 41 to 49, 51 to 56, 72 to 75, and the linear seams 61 to 71, 76, 77.

By providing the annular seams 41 to 43, a gas flow path width is narrowed at a part of the annular seams 41 to 43, that is, a connection portion (a boundary portion) 17 between the top chamber 10 and the first chamber 11, so that the rear seat airbag 1 is easily bent at this portion when the rear seat airbag 1 is inflated. Similarly, by providing the annular seams 44 to 46, 47 to 49, 54, 55, the rear seat airbag 1 is easily bent respectively at the connection portion (the boundary portion) 15 between the first chamber 11 and the second chamber 12 and the connection portion (the boundary portion) 16 of the second chamber 12 and the third chamber 13 when the rear seat airbag 1 is inflated The upper ends of the first tethers 21 and the second tethers 22 are sewn into the annular seams 74, 75. The lower ends (the rear ends) of the first tethers 21 are sewn into the annular seams 44, 46, as illustrated in FIG. 6. A reference numeral 21a in FIG. 6 indicates the suture thread. The lower ends of the second tethers 22 are sewn into the annular seams 54, 56. The front ends of the third tethers 23 are sewn into the annular seams 51, 53. The rear ends of the third tethers 23 are sewn into the annular seams 47, 49.

The rear seat airbag 1 thus configured is folded in the ceiling portion 4 and covered with a roof garnish.

At a time of vehicle collision, the inflator 14 is activated to blow out gas, so that the rear seat airbag 1 is inflated. As illustrated in FIG. 1, the top chamber 10 is inflated along the ceiling portion 4, and the first chamber 11 is obliquely inflated downward and rearward from the rear end of the top chamber 10. The second chamber 12 is inflated downward from the lower end of the first chamber 11, and the third chamber 13 is inflated forward, along the upper surfaces of the thighs of the rear seat occupant M, from the lower end of the second chamber 12. The front end of the third chamber 13 abuts against a rear surface of a front seat 2.

The connection portion 15 between the first chamber 11 and the second chamber 12 is pulled forward and upward by the first tethers 21 so that the first chamber 11 and the second chamber 12 are inflated to a position along a front surface of the rear seat occupant M. At this time, the first chamber 11 is inclined forward as being upward, and the second chamber 12 is slightly inclined forward as being substantially vertical or downward. The connection portion 15 between the first chamber 11 and the second chamber 12 is located lower than a head of the occupant M.

A part from the chest to the abdomen of the rear seat occupant M is restrained by the inflated second chamber 12, and the head is restrained by the first chamber 11. The first chamber 11 is widely expanded in a substantially planar shape in front of the head, and the second chamber 12 is widely expanded in a substantially planar shape in front of a part from the chest to the body. Accordingly, the receiving area which receives the occupant M is large.

The front end of the third chamber 13 of the inflated rear seat airbag 1 abuts against the rear surface of the front seat 2, so that forward movements of the first chamber 11 and the second chamber 12 are prevented.

In this embodiment, as illustrated in FIG. 1, the third tether 23 has such a length that the front end of the third chamber 13 is higher than the intermediate portion (the connection portion of the second tethers 22) of the third chamber 13 in the front-rear direction. Therefore, even when the front seat 2 is located at a forefront portion of a seat adjuster or at a rearmost portion of the seat adjuster, the front end of the third chamber 13 easily abuts against the rear surface of the front seat 2.

Figure 7:
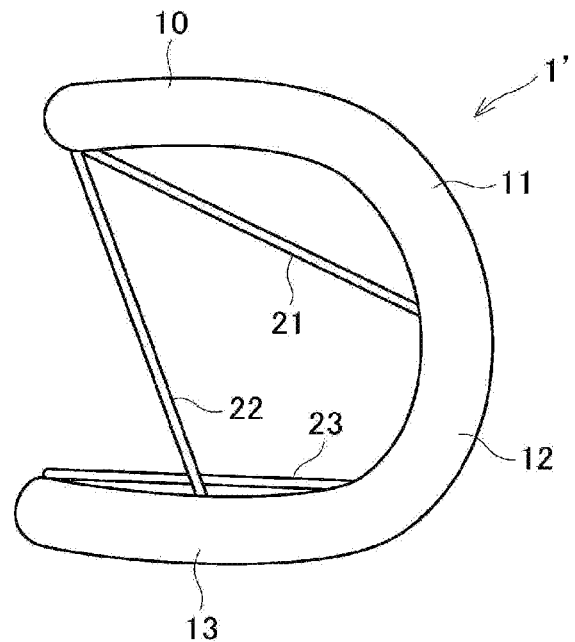
FIG. 7 is a side view of a rear seat airbag when the rear seat airbag is inflated according to a modification.

While the rear seat airbag 1 in FIGS. 1 to 6 is bent at the connection portions of the chambers 10, 11, 12, 13 when the rear seat airbag 1 is inflated, a rear seat airbag 1' in FIG. 7 may be not bent but curved in a C-shape in a side view when the rear seat airbag 1' is inflated. Other reference numerals in FIG. 7 denote the same parts as those in FIG. 1.

The above embodiment is an example of the present invention, and the present invention may be configured other than illustrated. For example, while the third tethers 23 are provided on the rear seat airbags 1, 1', the third tethers 23 may be omitted. Further, the top chamber 10 may be omitted, and ejected gas from the inflator 14 may be directly introduced into the first chamber 11. The upper ends of the first tethers 21 and second tethers 22 may be connected to a vehicle member in front of the rear seat airbag, for example, a case of the rear seat airbag device.

In the present invention, a center in a left-right direction of a rear surface of at least one of the first chamber 11 and the second chamber 12 may be recessed toward front of the vehicle as compared with left and right sides. In the first chamber or the second chamber, the rear seat occupant is received substantially perpendicular to a left half side or a right half side of the rear surface of the first chamber or the second chamber at the time of oblique collision or offset collision.

Second Embodiment

Figure 8:
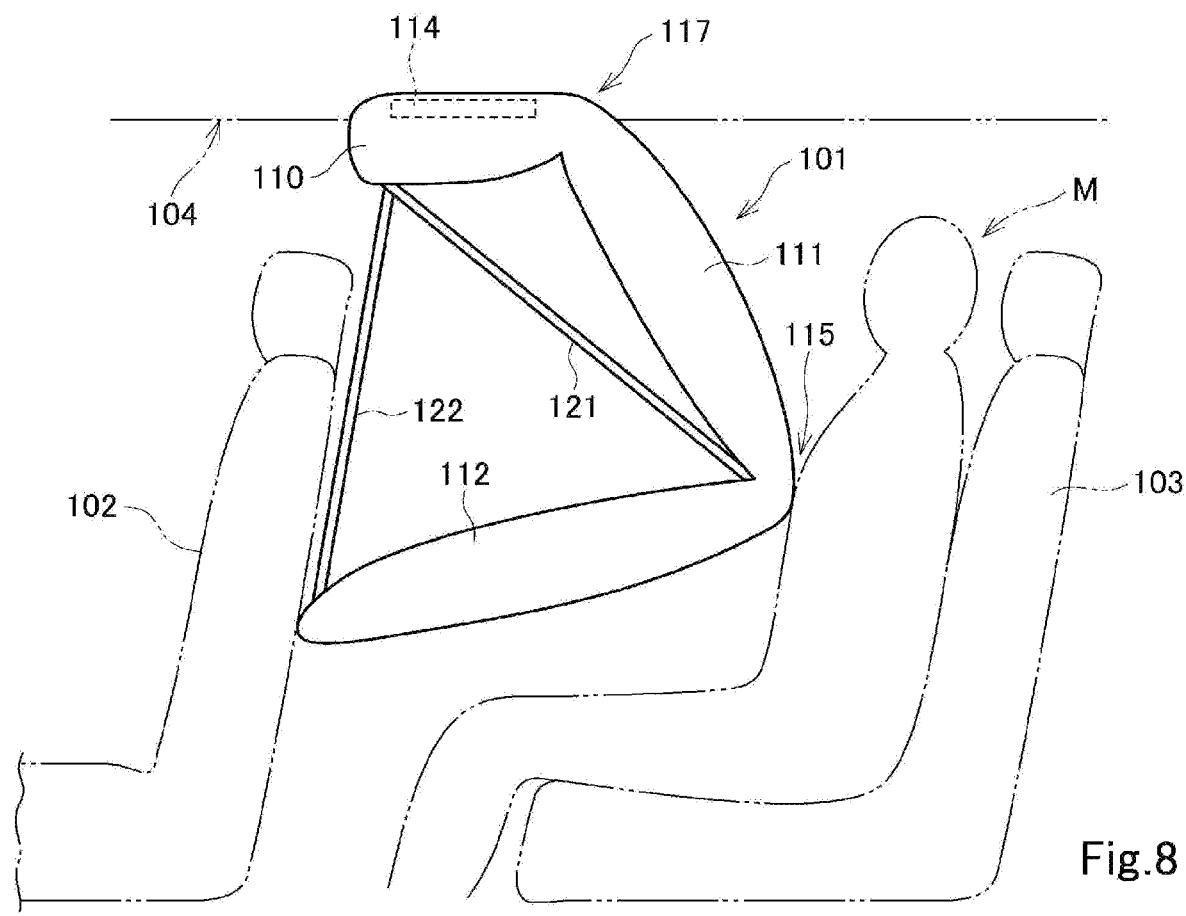
FIG. 8 is a side view of a rear seat airbag when the rear seat airbag is inflated according to a second embodiment.
Figure 9:
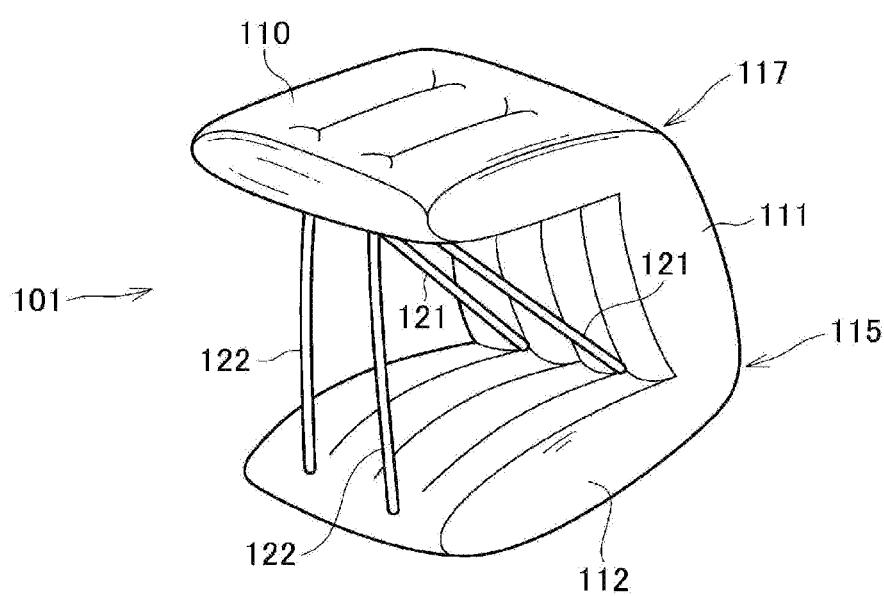
FIG. 9 is a perspective view of the rear seat airbag when the rear seat airbag is inflated according to the second embodiment.

FIGS. 8 and 9 illustrate a rear seat airbag 101 according to the second embodiment of the present invention. The rear seat airbag 101 is used for restraining the occupant M on a rear seat 103 by being inflated downward or being inflated downward and rearward from a ceiling portion 104 of a vehicle between a front seat 102 and the rear seat 103 of the vehicle.

The rear seat airbag 101 includes a first chamber 111 which is inflated downward and rearward from the ceiling portion 104, and a second chamber 112 which is continuous from a lower portion of the first chamber 111 and is inflated forward.

In this embodiment, the rear seat airbag 101 further includes a top chamber 110 which is inflated along the ceiling portion 104. An upper portion of the first chamber 111 is continuous from a rear portion of the top chamber 110.

An inflator 114 is installed in the top chamber 110, and the rear seat airbag 101 is inflated by gas from the inflator 114. The top chamber 110 is attached and fixed to the ceiling portion 104 at at least two places in a vehicle front-rear direction.

The rear seat airbag 101 includes first tethers 121 and second tethers 122 which connect a front portion of the top chamber 110 and a predetermined portion of the rear seat airbag 101.

The first tethers 121 are disposed on a front side of the first chamber 111, and the second tethers 122 are disposed on a front side of the first chamber 111 and the second chamber 112. Upper ends of the tethers 121, 122 are sewn to the front portion of the top chamber 110. Lower ends (rear ends) of the first tethers 121 are sewn to a connection portion (a boundary portion) 115 between the first chamber 111 and the second chamber 112 or a peripheral portion of the connection portion 115. Lower ends of the second tethers 122 are sewn to a front portion of the second chamber 112.

Similar to the rear seat airbag 1 according to the first embodiment, the rear seat airbag 101 is manufactured by sewing a front panel and a rear panel together. A method of sewing the first tethers 121 and second tethers 122 is the same as a method of the first embodiment. In addition, annular seams are provided such that the rear seat airbag 1 is easily bent at the connection portion (the boundary portion) 115 between the first chamber 111 and the second chamber 112 when the rear seat airbag 101 is inflated, and a gas flow path width is narrowed at the connection portion 115. Similarly, annular seams are provided such that the rear seat airbag 1 is easily bent at a connection portion (a boundary portion) 117 between the top chamber 110 and the first chamber 111, and the gas flow path width is narrowed at the connection portion 117.

The rear seat airbag 101 thus configured is folded in the ceiling portion 104 and covered with a roof garnish.

At a time of vehicle collision, the inflator 114 is activated to blow out gas, so that the rear seat airbag 101 is inflated. As illustrated in FIGS. 8 and 9, the top chamber 110 is inflated along the ceiling portion 104, and the first chamber 111 is obliquely inflated downward and rearward from the rear end of the top chamber 110. The second chamber 112 is inflated, above thighs of the rear seat occupant M, forward from the lower end of the first chamber 111. The front end of the second chamber 112 abuts against a rear surface of a front seat 102. When the rear seat airbag 101 is inflated, the first tethers 121 and the second tethers 122 are radially expanded downward (downward and forward, and downward and rearward) from the ceiling portion 104 (the front portion of the top chamber 110), and the first tethers 121 and the second tethers 122 are stretched.

The connection portion 115 between the first chamber 111 and the second chamber 112 is pulled forward and upward by the first tethers 121, and the front portion of the second chamber 112 is pulled upward by the second tethers 122, so that the first chamber 111 and the second chamber 112 are inflated in front of the rear seat occupant M. At this time, the first chamber 111 is inclined forward as being upward, and the second chamber 112 is slightly inclined downward as being substantially horizontal or forward. The connection portion 115 between the first chamber 111 and the second chamber 112 is located lower than the head of the occupant M.

A head of the rear seat occupant M is restrained by the first chamber 111. The front end of the second chamber 112 of the inflated rear seat airbag 101 abuts against the rear surface of the front seat 102, so that forward movements of the first chamber 111 and the second chamber 112 are prevented.

Additional tethers other than the tethers 121, 122 may be further provided in a region surrounded by the top chamber 110, the first chamber 111, the second chamber 112 and the tethers 122 in a side view of the inflated rear seat airbag 101. It is preferable that the additional tethers are provided so as to radially expand, together with the tethers 121, 122, downward from the ceiling portion 104. The positions at which the upper ends of the tethers 121, 122 are sewn may be the same or different.

Figure 10:
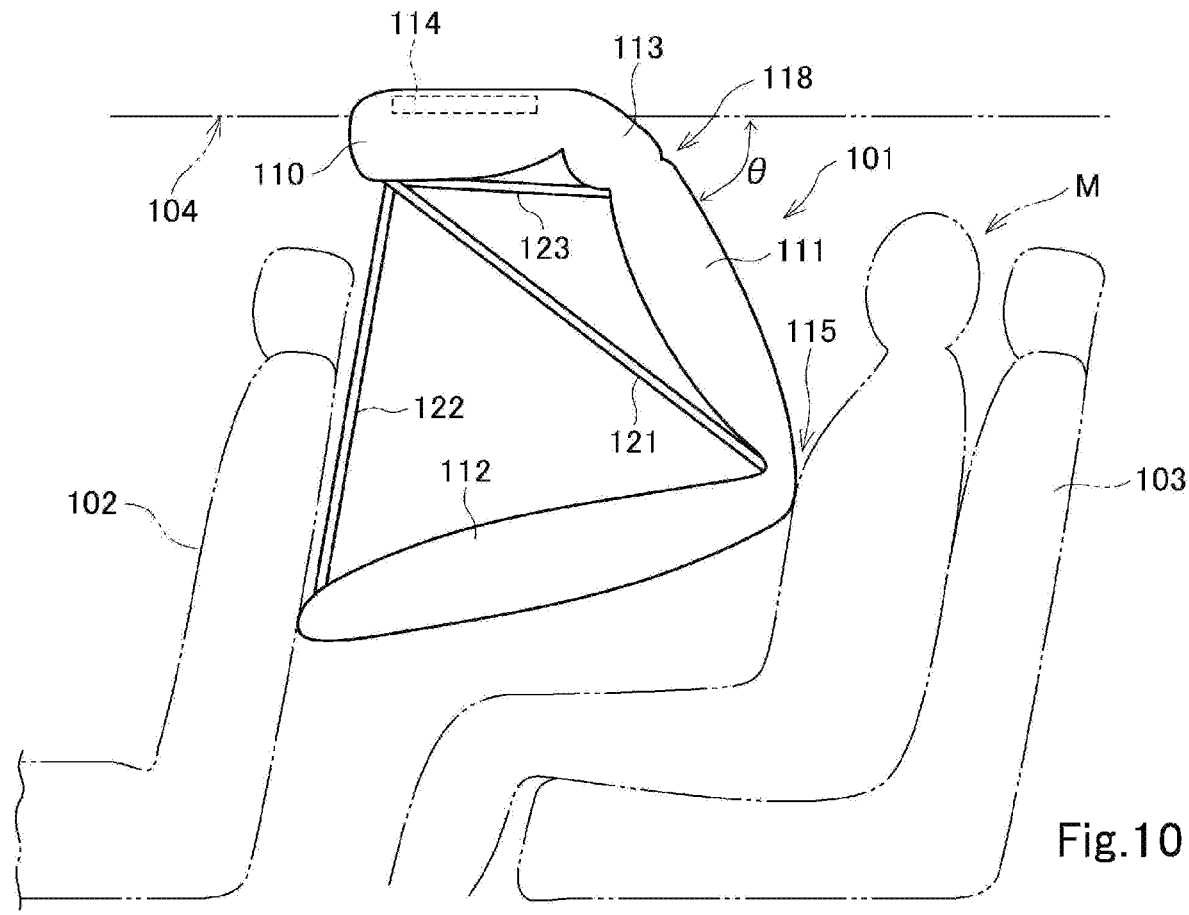
FIG. 10 is a side view of a rear seat airbag when the rear seat airbag is inflated according to a modification.

As illustrated in FIG. 10, a third chamber 113 may be added between the top chamber 110 and the first chamber 111. The third chamber 113 is inflated downward or inflated downward and rearward from the ceiling portion 104. An upper portion of the third chamber 113 is continuous from the rear portion of the top chamber 110, and a lower portion of the third chamber 113 is continuous from the upper portion of the first chamber 111.

In this case, it is preferable to provide third tethers 123 which connect a connection portion (a boundary portion) 118 between the third chamber 113 and the first chamber 111, and the front portion of the top chamber 110. By providing the third chamber 113 and the third tethers 123, an inclination angle θ (an intersection angle between a rear surface of the first chamber 111 and a horizontal surface) of the first chamber 111, which is an occupant head restraint surface, can be easily adjusted. The inclination angle θ is preferably substantially 25° to 65°, particularly substantially 40° to 50°.

Figure 11:
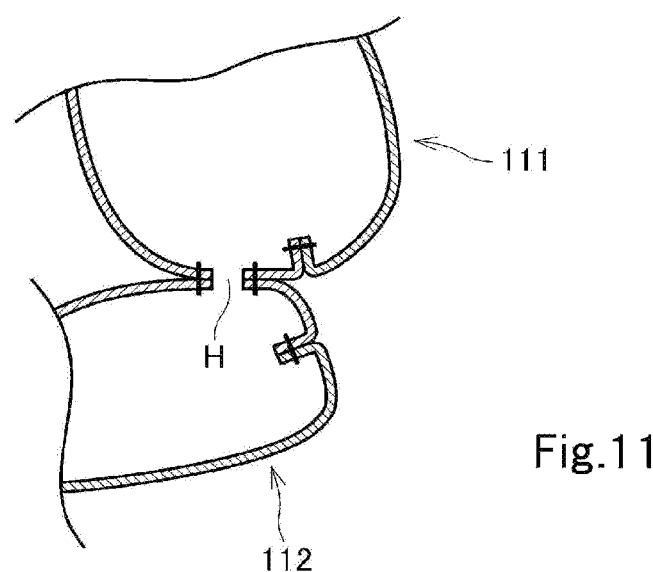
FIG. 11 is a partial cross-sectional view of the rear seat airbag according to the modification.

In the rear seat airbags 1, 101 according to the first and second embodiments, the peripheral portions of the front panel and the rear panel made of the base cloth having a substantially rectangular shape are sewn, and annular seams are provided at the connection portions (boundary portions) of the respective chambers, so that the rear seat airbags 1, 101 are easily bent when inflated. The respective chambers may be formed of different panels and connected by sewing a periphery of a connection hole H, so that interiors of the chambers are connected with each other, as illustrated in FIG. 11.

Figure 12:
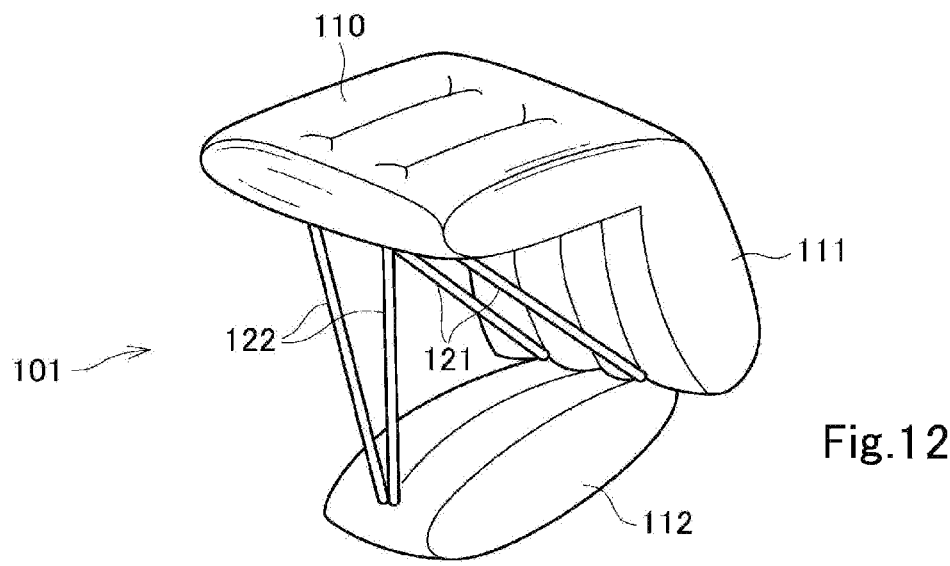
FIG. 12 is a perspective view of the rear seat airbag when the rear seat airbag is inflated according to the modification.

As illustrated in FIG. 12, left and right side portions of the second chamber 112 of the rear seat airbag 101 according to the second embodiment may be omitted, and a left-right width of the entire second chamber 112 may be made smaller than a left-right width of the first chamber 111. That is, a left end and a right end of the first chamber (the upper chamber) 111 may protrude to both left and right sides from a left end and a right end of the second chamber (the lower chamber) 112. For example, the left-right width of the second chamber 112 is made smaller than a shoulder width of the rear seat occupant M.

Figure 13:
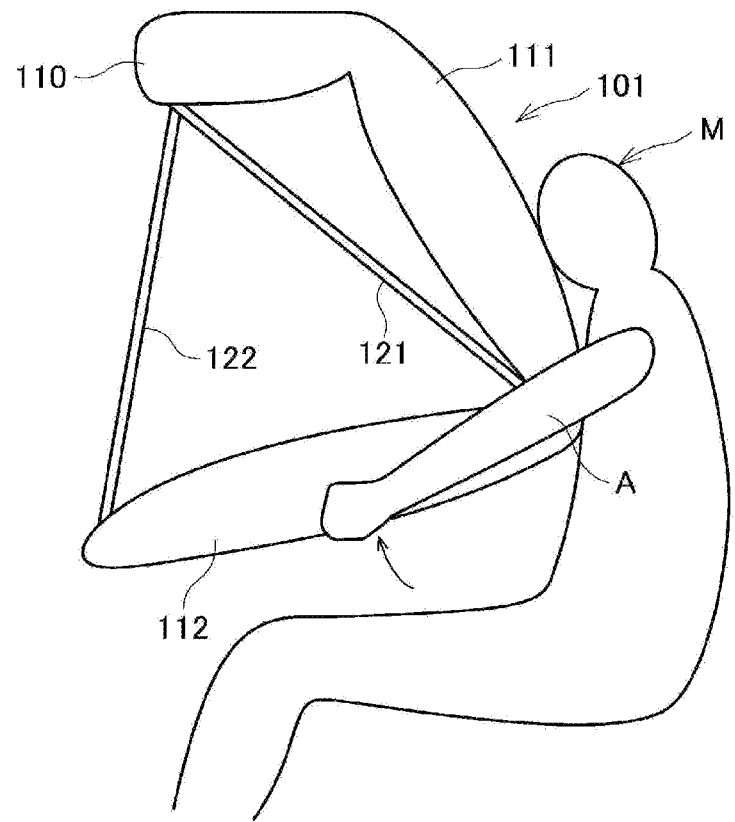
FIG. 13 is a side view of the rear seat airbag when an occupant is restrained according to the modification.

As a result, as illustrated in FIG. 13, even if an arm A of the rear seat occupant M moves upward at the time of vehicle collision, the arm A does not contact the rear seat airbag 101 or hardly pushes up the rear seat airbag 101 even if the arm A contacts the rear seat airbag 101. The left-right width of the first chamber 111 is larger than the left-right width of the second chamber 112, and an occupant receiving area is large, so that the head of the occupant is restrained.

Figure 14:
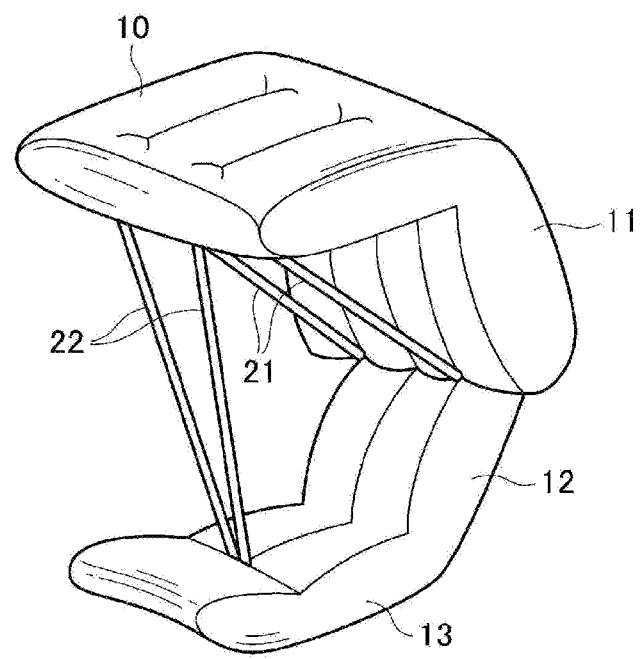
FIG. 14 is a perspective view of the rear seat airbag when the rear seat airbag is inflated according to the modification.

Similarly, as illustrated in FIG. 14, a left-right width of a lower chamber including the second chamber 12 and the third chamber 13 of the rear seat airbag 1 according to the first embodiment may be made smaller than a left-right width of an upper chamber including the first chamber 11.

Figure 15:
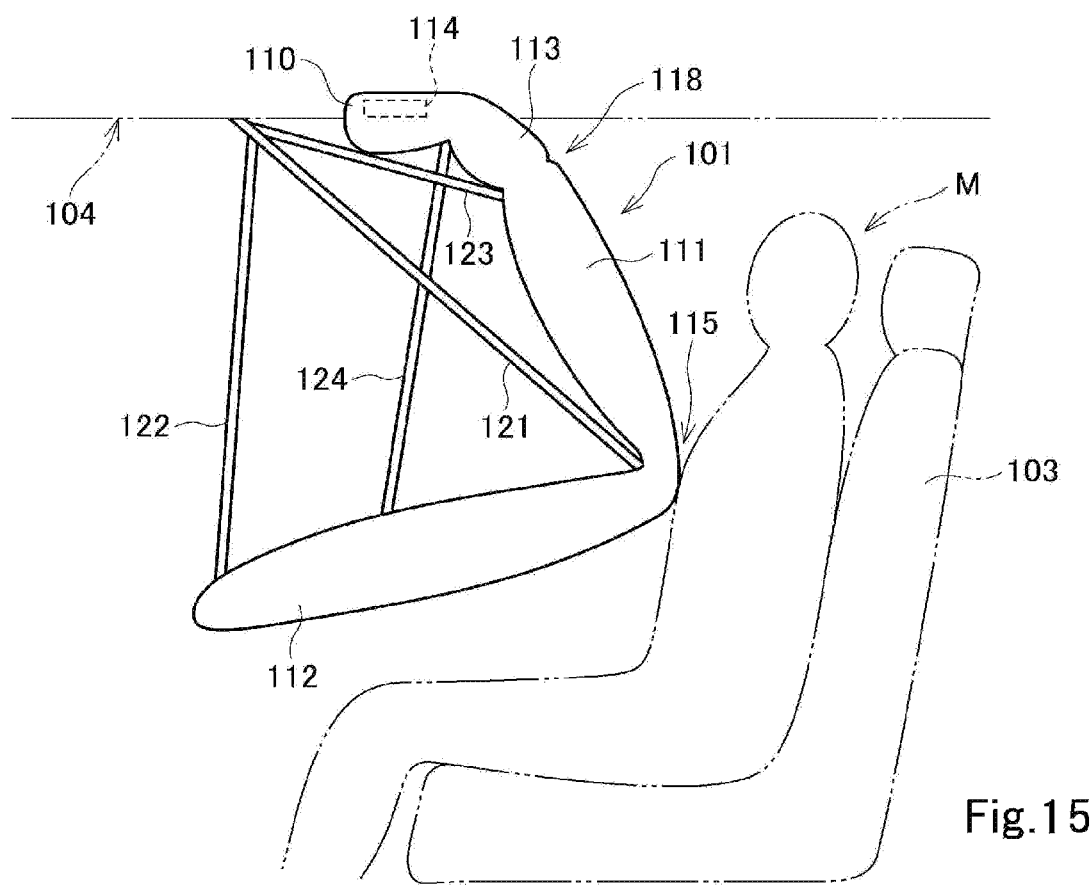
FIG. 15 is a side view of the rear seat airbag when the rear seat airbag is inflated according to the modification.

As illustrated in FIG. 15, fourth tethers 124 may be further provided to connect a connection portion between the third chamber 113 and the top chamber 110 and an intermediate portion (for example, in a vicinity of an intermediate portion of the second chamber 112 in the front-rear direction) of the second chamber 112 in the front-rear direction. Upper ends (front ends) of the first tethers 121, the second tethers 122 and the third tethers 123 may be connected to the ceiling portion 104 ahead of the top chamber 110, for example, to a vehicle body member or an airbag case.

The fourth tethers 124 is provided, so that the intermediate portion of the second chamber 112 in the front-rear direction is not bent downward, and the second chamber 112 is inflated and expanded substantially straight.

Figure 16:
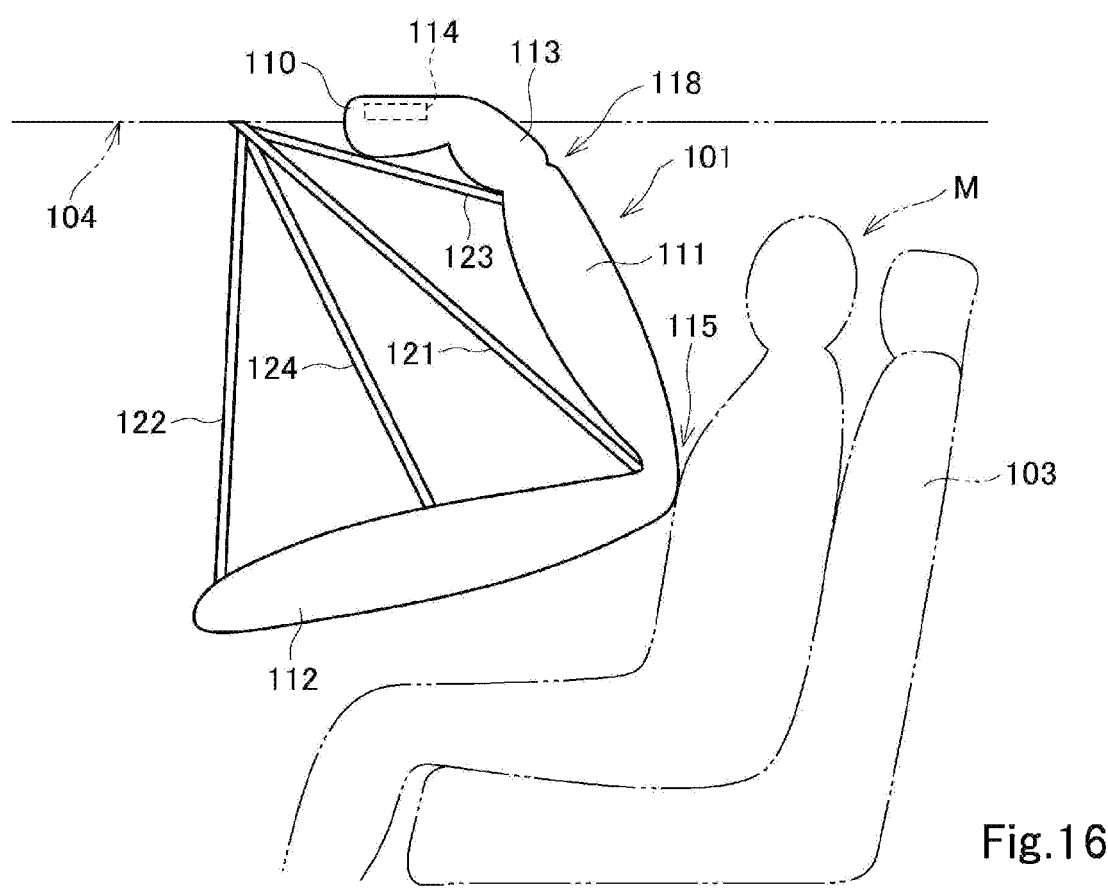
FIG. 16 is a side view of the rear seat airbag when the rear seat airbag is inflated according to the modification.

As illustrated in FIG. 16, an upper end of the fourth tether 124 may be connected to the same location as the upper ends of the first tether 121, the second tether 122 and the third tether 123, and the four tethers may extend radially downward from the ceiling portion 104.

Third Embodiment

Figure 17:
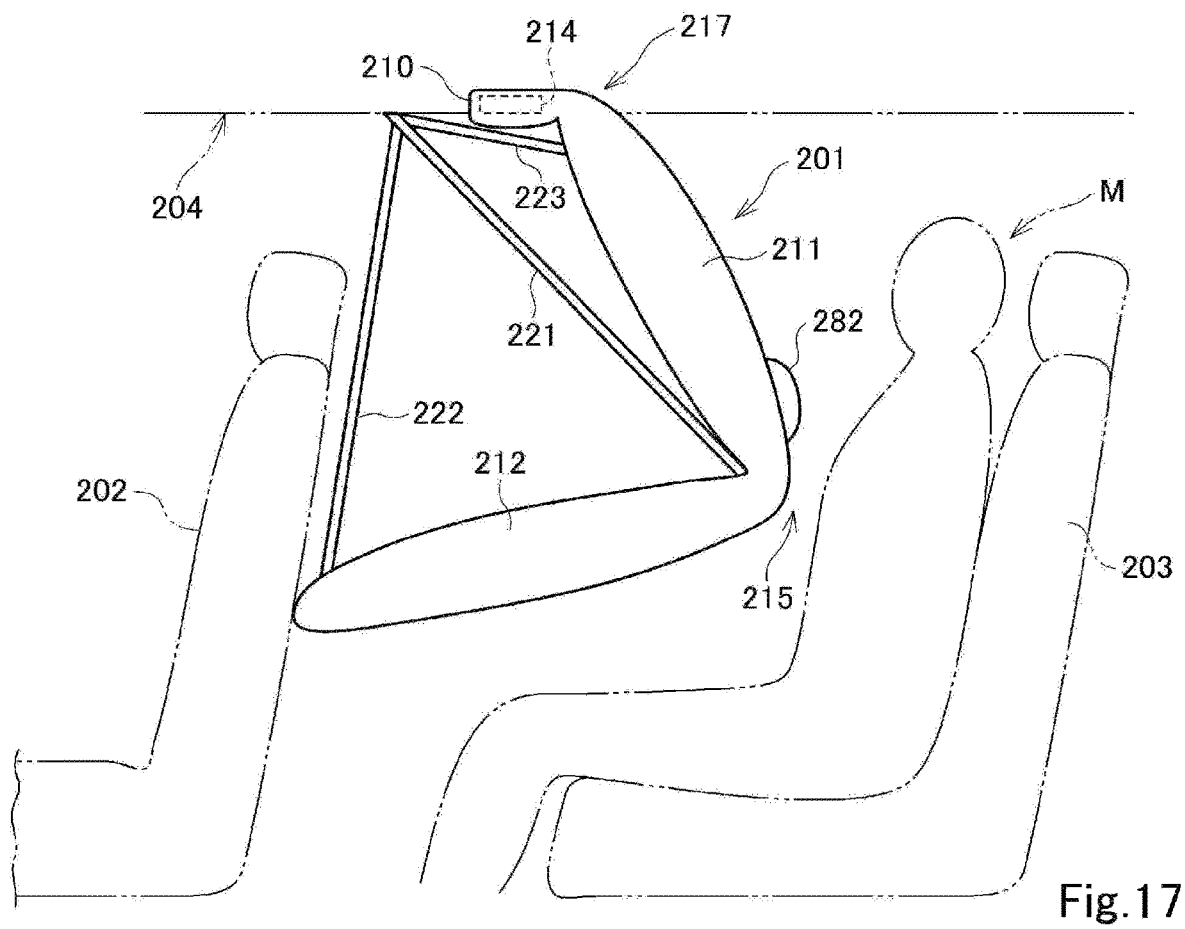
FIG. 17 is a side view of a rear seat airbag when the rear seat airbag is inflated according to a third embodiment.
Figure 18:
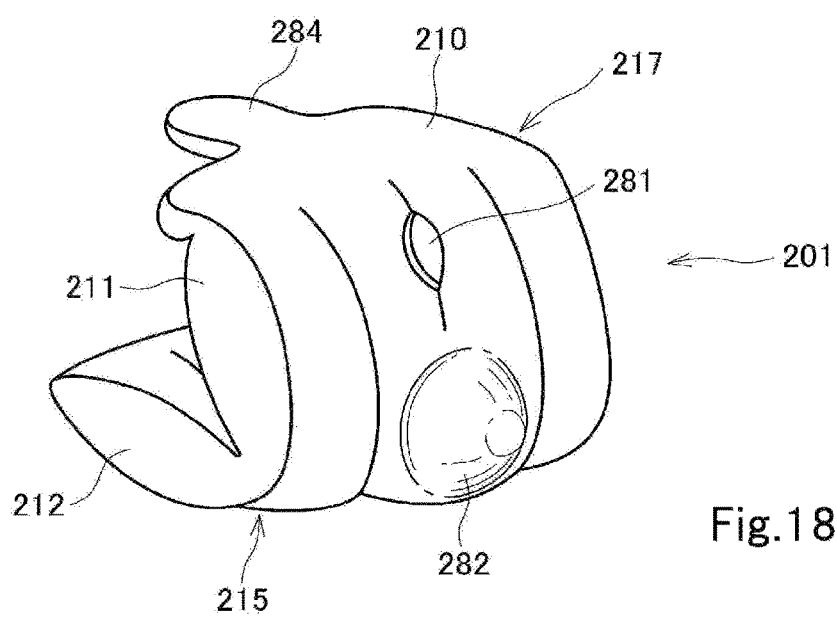
FIG. 18 is a perspective view of the rear seat airbag when the rear seat airbag is inflated according to the third embodiment.

FIGS. 17 to 19 illustrate a rear seat airbag 201 according to the third embodiment of the present invention. The rear seat airbag 201 is used for restraining the occupant M on a rear seat 203 by being inflated downward or being inflated downward and rearward from a ceiling portion 204 of a vehicle between a front seat 202 and the rear seat 203 of the vehicle.

The rear seat airbag 201 includes a first chamber 211 which is inflated downward and rearward from the ceiling portion 204, and a second chamber 212 which is continuous from a lower portion of the first chamber 211 and is inflated forward.

The rear seat airbag 201 further includes a top chamber 210 which is inflated along the ceiling portion 204. An upper portion of the first chamber 211 is continuous from a rear portion of the top chamber 210. An inflator 214 is installed in the top chamber 210, so that the rear seat airbag 201 is inflated by gas from the inflator 214. The top chamber 210 is attached and fixed to the ceiling portion 204 at at least two places in a vehicle front-rear direction.

The rear seat airbag 201 includes first tethers 221, second tethers 222 and third tethers 223 which connect the ceiling portion 204 forward of the top chamber 210 and predetermined portions of the rear seat airbag 201. In FIG. 18, the tethers 221, 222, 223 are not illustrated.

An upper end of each of the tethers 221, 222, 223 is connected to the ceiling portion 204 forward of the top chamber 210, for example, to a vehicle body member or an airbag case. Lower ends (rear ends) of the first tethers 221 are sewn to a connection portion (a boundary portion) 215 between the first chamber 211 and the second chamber 212 or a peripheral portion of the connection portion 215. Lower ends of the second tethers 222 are sewn to a front portion (a front end portion) of the second chamber 212. Lower ends (rear ends) of the third tethers 223 are sewn to a connection portion (a boundary portion) 217 between the first chamber 211 and the top chamber 210 or a peripheral portion of the connection portion 217.

A concave portion 281 is provided at a center of a rear surface of the first chamber 211 in the left-right direction, and at a center or slightly above the center in an up-down direction. The concave portion 281 is recessed toward front of the vehicle as compared to left and right sides.

A convex portion 282 is provided at a lower portion of the rear surface of the first chamber 211 and at the center in the left-right direction. The convex portion 282 protrudes in a convex shape toward rear of the vehicle as compared to left and right sides.

FIG. 19 is a top view illustrating a state where the rear seat airbag 201 before inflation is flattened. The rear seat airbag 201 is manufactured by sewing a front panel 231 and a rear panel (not illustrated) together.

The front panel 231 and the rear panel are made of a base cloth having a substantially rectangular shape which is long in one direction. Peripheral portions of the front panel 231 and the rear panel are sewn together by a seam 268.

The front panel 231 and the rear panel are also sewn together by annular seams 241 to 248, and linear seams 261 to 267 to be described below.

At a boundary portion 217 between the top chamber 210 and the first chamber 211, a plurality of (in this embodiment, three) the annular seams 241, 242, 243 are provided at intervals in a width direction of the rear seat airbag 201.

At a boundary portion 215 between the first chamber 211 and the second chamber 212, a plurality of (in this embodiment, three) the annular seams 244, 245, 246 are provided at intervals in a width direction of the rear seat airbag 201.

The annular seams 247, 248 are spaced at an interval between the annular seam 242 and the annular seam 245. A slit S extending in a longitudinal direction of the rear seat airbag 201 is formed inside the annular seam 247 in the front panel 231 and the rear panel.

The linear seam 261 is provided so as to connect the annular seam 241 and the annular seam 244. The linear seam 262 extending in the longitudinal direction of the rear seat airbag 201 is provided so as to connect the annular seam 244 and the seam 268 on a front end side of the rear seat airbag 201.

The linear seam 266 is provided so as to connect the annular seam 243 and the annular seam 246. The linear seam 267 extending in the longitudinal direction of the rear seat airbag 201 is provided so as to connect the annular seam 246 and the seam 268 on the front end side of the rear seat airbag 201.

At a central portion of the rear seat airbag 201 in the width direction, the linear seams 263, 264 are provided so as to sequentially connect the annular seams 242, 247, 248. The linear seam 265 extending in the longitudinal direction of the rear seat airbag 201 is provided so as to connect the annular seam 245 and the seam 268 on the front end side of the rear seat airbag 201.

No seam is provided between the annular seam 245 and the annular seam 248. A region surrounded by the annular seams 244, 245, 246, 248 becomes the convex portion 282 described above when the rear seat airbag 201 is inflated. The location where the slit S is formed becomes the concave portion 281 described above when the rear seat airbag 201 is inflated.

An end portion of the top chamber 210 in the longitudinal direction is narrow in width and serves as an inflator deployment chamber 284 in which the inflator 214 is deployed. In the present embodiment, the inflator 214 is of a cylinder type. The inflator 214 is disposed such that a gas ejection port is on the rear side.

The lower ends (the rear ends) of the third tethers 223 are sewn to insides of the annular seams 241, 242, 243. The lower ends (the rear ends) of the first tethers 221 are sewn to insides of the annular seams 244, 245, 246. The lower ends of the second tethers 222 are sewn to a front end portion of the front panel 231.

The rear seat airbag 201 thus configured is folded in the ceiling portion 204 and covered with a roof garnish.

At the time of vehicle collision, the inflator 214 is activated to blow out gas, so that the rear seat airbag 201 is inflated. As illustrated in FIG. 17, the top chamber 210 is inflated along the ceiling portion 204, and the first chamber 211 is obliquely inflated downward and rearward from the rear end of the top chamber 10. The second chamber 212 is inflated forward from a lower end of the first chamber 211.

The first chamber 211 in an inflated state is widely expanded in front of an upper body of the occupant M. A jaw of the occupant M is restrained by the convex portion 282 formed at the lower portion of the rear surface of the first chamber 211 and at the center in the left-right direction. A forehead of the occupant M is restrained by the concave portion 281 formed on the rear surface of the first chamber 211 and above the convex portion 282.

In the rear seat airbag 201, although the concave portion 281 is formed by the slit S, a circular opening may be provided in the annular seam 247, and the concave portion 281 may be formed when the rear seat airbag 201 is completely inflated.

While having been described in the above embodiments, the rear seat airbags 1, 101, 201 can also be applied to a driver seat, a passenger seat and other seats as long as they are configured to be inflated in front of an occupant.

This application is based on Japanese Patent Application 2016-137693 filed on Jul. 12, 2016, Japanese Patent Application 2016-166949 filed on Aug. 29, 2016, and Japanese Patent Application 2016-239722 filed on Dec. 9, 2016, entireties of which are incorporated by reference.

REFERENCE SIGNS LIST 1, 1', 101, 201 rear seat airbag
2, 102, 202 front seat
3, 103, 203 rear seat
4, 104, 204 ceiling portion
10, 110, 210 top chamber
11, 111, 211 first chamber
12, 112, 212 second chamber
13, 113, 213 third chamber
21, 121, 221 first tether
22, 122, 222 second tether
23, 123, 223 third tether
31, 231 front panel
32 rear panel
41 to 56, 72 to 75, 241 to 248 annular seam
61 to 71, 76, 77, 261 to 267 linear seam
281 concave portion
282 convex portion

The invention claimed is:

1. An airbag which is adapted to be inflated in front of an occupant seated in a seat by gas from an inflator, the airbag comprising:
   a first chamber that is inflated downward and rearward from a vehicle interior ceiling portion;
   a second chamber that is continuous from a lower portion of the first chamber and that is inflated forward; and,
   a first tether that is connected between a connection portion of the first chamber and the second chamber or a peripheral portion of the connection portion, and a part in front of the first chamber.

2. The airbag according to claim 1,
   wherein the connection portion of the first chamber and the second chamber is a bending point of the airbag in a state where the airbag is inflated.

3. The airbag according to claim 1, comprising:
a second tether that is connected between the second chamber and a part in front of the first chamber.

4. The airbag according to claim 1, further comprising:
a second tether that is connected between the second chamber and the part in front of the first chamber; and
a top chamber that is inflated along the vehicle interior ceiling portion,
wherein the first chamber is continuous from a rear portion of the top chamber, and
wherein an upper end of the first tether and an upper end of the second tether are continuous from a front portion of the top chamber.

5. The airbag according to claim 4,
wherein the top chamber is fixed to the vehicle interior ceiling portion at at least two places in a front-rear direction.

6. The airbag according to claim 4, further comprising:
a third chamber that is provided between the top chamber and the first chamber.

7. The airbag according to claim 6, further comprising:
a third tether that is connected between the front portion of the top chamber and a connection portion of the first chamber and the third chamber.

8. The airbag according to claim 7, comprising:
a fourth tether that is connected between an intermediate portion of the second chamber in a front-rear direction, and an upper portion of the first chamber or a portion in front of the upper portion.

9. The airbag according to claim 1,
wherein a gas flow path width is narrowed in the connection portion of the first chamber and the second chamber.

10. The airbag according to claim 1, further comprising:
a plurality of tethers that extends radially downward from the vehicle interior ceiling portion in the state where the airbag is inflated,
wherein each of the tethers of the plurality of tethers is continuous to a predetermined portion of the airbag.

11. The airbag according to claim 1,
wherein an intersection angle between a rear surface of the first chamber and a horizontal surface is 25° or more and 65° or less in the state where the airbag is inflated.

12. The airbag according to claim 1,
wherein in the state where the airbag is inflated, a center portion in a left-right direction of a rear surface of the first chamber is a concave portion which is recessed forward from left and right of the concave portion.

13. The airbag according to claim 1,
wherein in the state where the airbag is inflated, a center portion in a left-right direction, as well as a lower portion in an upper-lower direction of a rear surface of the first chamber, is a convex portion which protrudes rearward from left and right of the convex portion.

14. The airbag according to claim 1,
wherein a left-right width of the first chamber is larger than a left-right width of the second chamber.

15. An airbag which is adapted to be inflated in front of an occupant seated in a seat by gas from an inflator, the airbag comprising:
a first chamber that is inflated downward and rearward from a vehicle interior ceiling portion;
a second chamber that is continuous from a lower portion of the first chamber and that is inflated downward; and
a third chamber that is continuous from a lower portion of the second chamber and that is inflated forward; and,
a first tether that is connected between a connection portion of the first chamber and the second chamber or a peripheral portion of the connection portion, and a part in front of the first chamber.

16. The airbag according to claim 15, comprising:
a second tether that is connected between the third chamber and a part in front of the first chamber.

17. The airbag according to claim 16,
wherein the second tether is continuous to an intermediate portion of the inflated third chamber in a front-rear direction, and
wherein a third tether is provided such that the third tether is connected between a front portion of the third chamber and a connection portion of the second chamber and the third chamber.

18. The airbag according to claim 17,
wherein in a state where the airbag is inflated, the front portion of the third chamber is located higher than the intermediate portion in the front-rear direction of the third chamber connected to the second tether.

19. The airbag according to claim 16,
wherein the airbag comprises a top chamber that is inflated along the vehicle interior ceiling portion,
wherein the first chamber is continuous from a rear portion of the top chamber, and
wherein an upper end of the first tether and an upper end of the second tether are continuous from a front portion of the top chamber.

20. The airbag according to claim 19,
wherein a gas flow path width is narrowed in a connection portion of the top chamber and the first chamber.

21. The airbag according to claim 15,
wherein a gas flow path width is narrowed in the connection portion of the first chamber and the second chamber and a gas flow path width is narrowed in the connection portion of the second chamber and the third chamber.

22. The airbag according to claim 15,
wherein the third chamber is inflated such that a front portion of the third chamber abuts against a rear surface of a front seat.

23. The airbag according to claim 15,
wherein the connection portion of the first chamber and the second chamber is adapted to be located below a head of the occupant.

24. The airbag according to claim 15,
wherein a center portion in a left-right direction of a rear surface of the first chamber is a concave portion which is recessed forward from left and right of the concave portion.

* * * * *